UNITED STATES PATENT OFFICE.

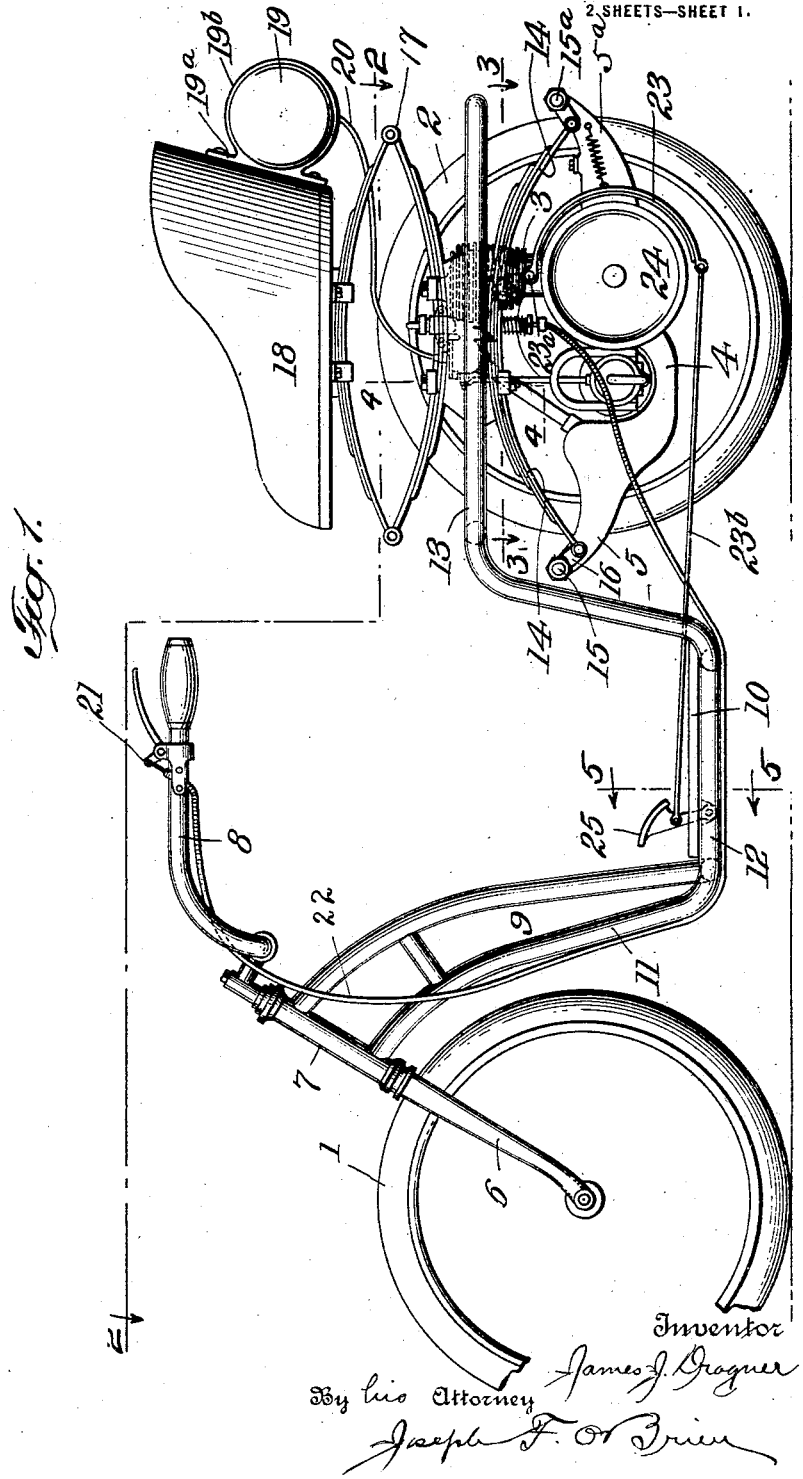

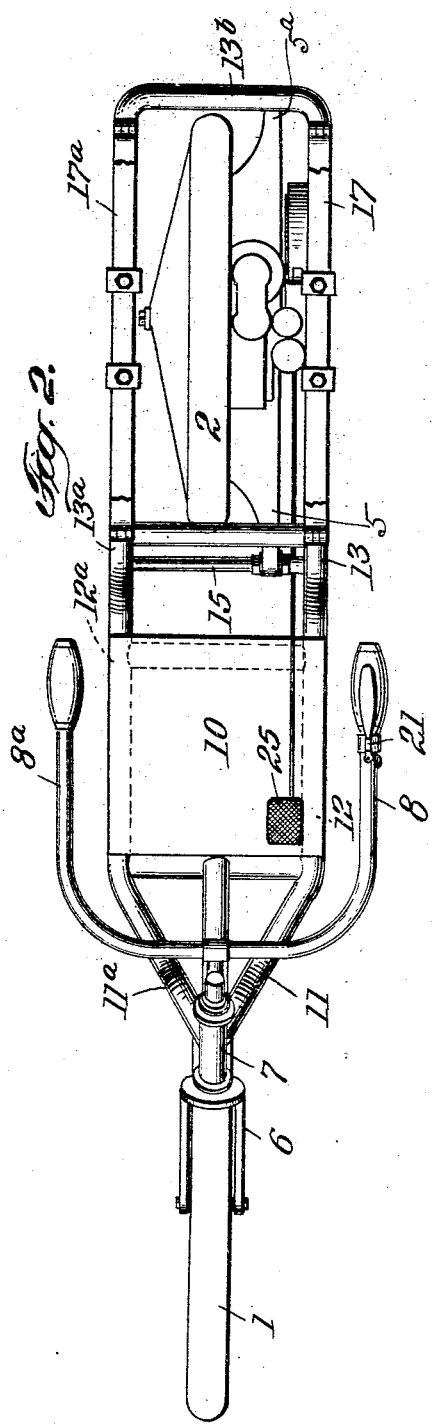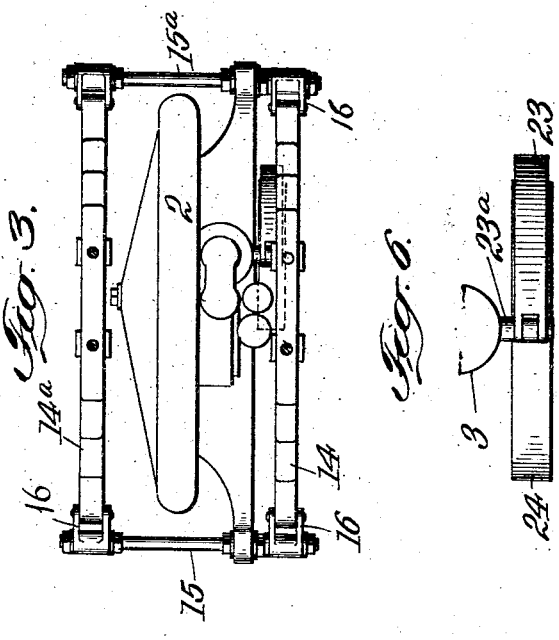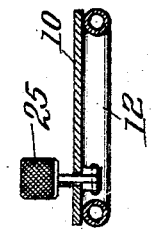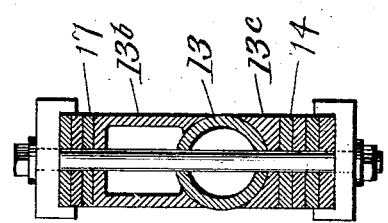

JAMES J. DRAGNER, OF NEW YORK, N. Y.

SELF-PROPELLED VEHICLE.

1,286,252.   Specification of Letters Patent.   Patented Dec. 3, 1918.

Application filed October 12, 1916.   Serial No. 125,136.

*To all whom it may concern:*

Be it known that I, JAMES J. DRAGNER, a citizen of the United States, and a resident of the borough of Manhattan, city, county and State of New York, have invented certain new and useful Improvements in Self-Propelled Vehicles, of which the following is the specification.

This invention relates to improvements in self-propelled vehicles.

By the use of my invention, I produce a self-propelled vehicle which will be as light as possible consistent with the comfort of the rider, will have greater stability than vehicles or cycles of similar character heretofore used, may be readily controlled; many of the parts usually employed in motor cycles will be eliminated and the vehicle will, therefore, be simplified and the cost of manufacture decreased. The weight of the rider will be distributed evenly upon a motor-driven ground wheel so as to procure the maximum amount of traction and consequent speed and efficiency with substantially no vibration from the engine, and shocks due to the traveling of the vehicle over uneven roadways will be absorbed or compensated for.

Another feature of my invention comprises the combination with an engine having a fly wheel and a direct driving connection with a ground wheel, of a brake, operable by the rider, for braking the fly wheel to stop the engine and ground wheel.

Another feature of my invention consists of providing a front steering wheel, a rear ground wheel in tandem with the steering wheel, said ground wheel having an engine directly connected therewith, and a frame connecting said wheels having an intermediate depressed pushing platform for starting the vehicle through the action of the aforesaid directly-connected engine and ground wheel, together with a comfortable and vibrationless seat.

In the accompanying drawings in which similar reference characters designate corresponding parts throughout the several views, Figure 1 is a side elevation of a vehicle embodying my invention;

Fig. 2 is a section on the line 2—2 of Fig. 1;

Fig. 3 is a section on the line 3—3 of Fig. 1;

Fig. 4 is a section on the lines 4—4 of Fig. 1;

Fig. 5 is a section on the lines 5—5 of Fig. 1; and

Fig. 6 is a detailed view illustrating my preferred method of mounting the brake-band for the motor fly wheel.

Referring now to these drawings, 1 indicates a steering wheel and 2 an engine-driven ground wheel journaled on an engine frame 4 and having a direct connection with an engine 3 supported upon said engine frame 4 contiguous to one side of said ground wheel, and which frame 4 has brackets 5—5$^a$ extending radially from the axis of the said ground wheel in opposite directions beyond the tread surface of the wheel 2. The steering wheel 1 is mounted in the usual fork 6 extending to a steering head 7 having the usual handle bars 8—8$^a$. Intermediate said steering wheel and directly-driven ground wheel I provide a vehicle frame 9 having a depressed pushing or starting platform 10 and a chassis or body comprising bars 13, 13$^a$ extending on opposite sides of both the ground wheel 2 and its engine 3. The frame 9 is preferably formed by connecting to said steering head two downwardly and rearwardly extending bars 11—11$^a$ (Figs. 1 and 2) which diverge laterally and downwardly for a predetermined distance and then extend parallel to each other to provide supports 12—12$^a$ for said depressed pushing platform 10 which extends between said parallel bars. The bars continue parallel to each other and extend upwardly and thence again rearwardly in a horizontal direction to provide the elongated body or chassis bars 13—13$^a$ which, as shown, are connected at the rear by connecting bar 13$^b$.

In order to prevent the engine vibrations from being communicated to the chassis and vehicle frame and also to cause the weight of said chassis and its supported parts as well as the weight of the rider to be supported and evenly distributed on said ground wheel as low as possible so as to materially assist in stabilizing the vehicle, and to give great traction to said driving ground wheel, the engine frame brackets 5, 5$^a$ are respectively provided with axles 15, 15$^a$ extending laterally to opposite sides of the ground-wheel 2 and engine frame 4 and these axles 15, 15$^a$ are bridged on each side of the wheel and engine-frame by flat chassis supporting springs 14, 14ª, which are disposed below the top of the wheel and are connected to the engine frame by depending links 16, and then the chassis bars 13, 13ª are supported on said springs. To further prevent vibrations from reaching the rider and to compensate for or absorb shocks due to uneven roadways, I mount above the said chassis also on opposite sides of said wheel and engine, additional vehicle springs 17—17ª and bridging these springs as close to the top of the wheel 2 as possible, I provide a wide seat 18. The springs 17—17ª are, as shown, connected to the chassis or body portion, which consists of round or circular tubing of the ordinary type, by the use of filler strips 13ᵇ and 13ᶜ as illustrated in Fig. 4.

The fuel tank 19, as shown, is retained at the back of the seat 18 by brackets and straps 19ª and 19ᵇ. The connection between the tank 19 and carbureter of the engine is made by a flexible tube, and the engine is, as shown, controlled by a controlling device 21 mounted on the handle bars and connected to the engine by a flexible tube 22, said controlling device 21 being manipulated to control the throttle valve of the engine and also to relieve the compression so that it may be started by running the ground wheel along the roadway, and this may be readily and easily accomplished by placing one foot on the pushing platform 10 and running with the vehicle a short distance and then stepping on said platform and subsequently or simultaneously sitting down, the wheel 2 being of such size and the seat 18 being preferably so low that the feet of the rider may be used on opposite sides of the platform if necessary to right the vehicle, though the aforesaid distribution of weight and consequent stabilizing of the vehicle will render the use of the feet necessary only under extraordinary conditions.

In order to stop the vehicle quickly and to eliminate the usual braking devices, I provide a brake band 23 for the fly-wheel 24 of the engine, said band being pivoted on a pivot 23ª formed integrally with the engine cylinder or connected thereto in any suitable manner, and this brake-band is connected by rod 23ᵇ to a pedal 25 pivoted on the starting platform 10. Obviously when the brake-band is operated to stop the fly-wheel, the engine will be stopped and because of the direct connection between the engine and ground-wheel, the latter will be stopped. The weight being distributed on this wheel the vehicle will come to a quick stop.

Having described my invention, I claim:

1. In a self-propelled vehicle in combination, a front steering wheel, a rear driving wheel in tandem with said steering wheel, an engine frame at one side of said rear driving wheel on which said wheel is mounted, brackets on said engine frame extending radially in opposite directions beyond the tread portion of said driving wheel, an engine supported on said engine frame having a direct connection with said driving wheel, a vehicle-chassis mounted on opposite sides of said driving wheel and connected with said brackets, a frame connecting said chassis and steering wheel and a depressed pushing platform on said frame intermediate said wheels.

2. In a self-propelled vehicle in combination, a front steering wheel, a rear driving wheel in tandem with said steering wheel, an engine frame at one side of said driving wheel on which said wheel is mounted, brackets on said engine frame extending radially in opposite directions beyond the tread portion of said driving wheel, an engine supported on said engine frame having a direct connection with said driving wheel, a vehicle-chassis extending on opposite sides of said ground wheel and engine, axles for connecting said brackets to said chassis and a vehicle frame connecting said steering wheel and chassis having a pushing platform on said vehicle frame intermediate said wheels.

3. In a self-propelled vehicle in combination, a front steering wheel, a rear driving wheel in tandem with said steering wheel, an engine frame at one side of said wheel on which said wheel is mounted, brackets on said engine frame extending radially in opposite directions beyond the tread portion of said driving wheel, an engine supported on said engine frame having a direct connection with said driving wheel, a fly wheel for said engine, a vehicle frame connecting said brackets and steering wheel and means for braking said fly wheel to stop the engine and driving wheel.

4. In a self-propelled vehicle in combination, a front steering wheel, a rear driving wheel in tandem with said steering wheel, an engine frame at one side of said driving wheel on which said wheel is mounted, brackets on said frame extending radially in opposite directions beyond the tread portion of said driving wheel, an engine supported on said engine frame having a direct connection with said driving wheel, a vehicle frame connecting said brackets and steering wheel and having a chassis extending on opposite sides of said ground wheel and engine, carriage springs mounted on said chassis portion at opposite sides of said wheel, a seat connecting said carriage springs just above said wheel and a pushing platform on said vehicle frame intermediate said wheels.

5. In a self-propelled vehicle in combination, a front steering wheel, a rear driving wheel in tandem with said steering wheel, an engine frame at one side of said driving wheel on which said wheel is mounted, brackets on said frame extending radially in opposite directions beyond the tread portion of said driving wheel, an engine supported on said engine frame having a direct connection with said driving wheel, axles extending laterally from said brackets, flat springs connecting said axles and extending longitudinally on opposite sides of said wheel and engine frame, a chassis supported on said springs below the top of the wheel, a vehicle frame connecting said chassis and steering wheel, means for controlling and braking said vehicle.

In witness whereof, I have signed my name to the foregoing specification in the presence of two subscribing witnesses.

JAMES J. DRAGNER.

Witnesses:
 MARION WHITE,
 JOSEPH F. O'BRIEN.